(12) United States Patent
Nagara et al.

(10) Patent No.: US 7,990,681 B2
(45) Date of Patent: Aug. 2, 2011

(54) ALUMINUM ELECTROLYTIC CAPACITOR

(75) Inventors: Hisao Nagara, Kyoto (JP); Kazunari Imamoto, Yamaguchi (JP); Shigetaka Furusawa, Kyoto (JP); Hiroyuki Matsuura, Shiga (JP)

(73) Assignee: Panasonic Corporation, Osaka (JP)

( * ) Notice: Subject to any disclaimer, the term of this patent is extended or adjusted under 35 U.S.C. 154(b) by 398 days.

(21) Appl. No.: 12/300,058

(22) PCT Filed: May 9, 2007

(86) PCT No.: PCT/JP2007/059584
§ 371 (c)(1),
(2), (4) Date: Nov. 7, 2008

(87) PCT Pub. No.: WO2007/132708
PCT Pub. Date: Nov. 22, 2007

(65) Prior Publication Data
US 2009/0207557 A1      Aug. 20, 2009

(30) Foreign Application Priority Data
May 15, 2006   (JP) ................................ 2006-134889

(51) Int. Cl.
*H01G 9/00*    (2006.01)
(52) U.S. Cl. ........ 361/523; 361/504; 361/516; 361/525; 361/529; 361/530
(58) Field of Classification Search ................... 361/523, 361/516–519, 525, 528–529, 502–504, 509–512, 361/530–531; 29/25.01, 25.03
See application file for complete search history.

(56) References Cited

U.S. PATENT DOCUMENTS

| 6,307,732 | B1 * | 10/2001 | Tsubaki et al. | 361/509 |
| 6,504,705 | B2 * | 1/2003 | Shimada et al. | 361/528 |
| 6,690,573 | B2 * | 2/2004 | Honda et al. | 361/509 |
| 6,970,343 | B2 * | 11/2005 | Hayashi et al. | 361/504 |
| 7,375,950 | B2 * | 5/2008 | Fujii et al. | 361/540 |
| 7,400,491 | B2 * | 7/2008 | Minato et al. | 361/517 |

(Continued)

FOREIGN PATENT DOCUMENTS

JP         08-273984        10/1996

(Continued)

OTHER PUBLICATIONS

International Search Report for PCT/JP2007/059584; Jun. 12, 2007.

(Continued)

*Primary Examiner* — Nguyen T Ha
(74) *Attorney, Agent, or Firm* — Pearne & Gordon LLP

(57) ABSTRACT

An aluminum electrolytic capacitor having an excellent short-circuit resistance, high capacitance, long life, and low equivalent series resistance (ESR) is provided. For this purpose, the aluminum electrolytic capacitor includes a capacitor element having a positive electrode foil, a first separator, a negative electrode foil, and a second separator, which are sequentially laminated one on another and wound together. After the capacitor element is impregnated with a driving electrolyte solution and housed in a metallic case, an open end of the metallic case is sealed with a sealing material. A ratio of B/A, i.e. a ratio of total thickness B of the first and second separators after winding with respect to total thickness A of the first and second separators before winding, is set in the range from 0.5 to 0.8.

6 Claims, 2 Drawing Sheets

U.S. PATENT DOCUMENTS

| | | | |
|---|---|---|---|
| 7,729,103 B2 * | 6/2010 | Kato et al. | 361/525 |
| 2003/0169557 A1 * | 9/2003 | Noguchi et al. | 361/502 |

FOREIGN PATENT DOCUMENTS

| | | |
|---|---|---|
| JP | 11-086877 | 3/1999 |
| JP | 2950575 | 9/1999 |
| JP | 2000-173862 | 6/2000 |
| JP | 2002-231587 | 8/2002 |
| JP | 2003-249421 | 9/2003 |
| JP | 2003-264126 | 9/2003 |

OTHER PUBLICATIONS

Chinese Office action for corresponding application 200780017701 dated Jan. 5, 2011.
A machine translation of a previously cited foreign reference JP2003-264126A.
A machine translation of a previously cited foreign reference JP2950575B.
A machine translation of a previously cited foreign reference JP11-086877A.
A machine translation of a previously cited foreign reference JP2003-249421A.
A machine translation of a previously cited foreign reference JP2002-231587A.

* cited by examiner

ALUMINUM ELECTROLYTIC CAPACITOR

This application is a U.S. national phase application of PCT international application PCT/W2007/059584.

TECHNICAL FIELD

The present invention relates to an aluminum electrolytic capacitor used in various kinds of electronic equipment.

BACKGROUND ART

FIG. 2 shows a structure of a conventional aluminum electrolytic capacitor. The drawing is a partially cutaway view in perspective thereof. In this structure, capacitor element 19 is formed in the following manner. An aluminum foil is etched so that the effective surface area thereof is increased. A dielectric oxide film is formed on the surface of the etched aluminum foil by chemical treatment so that positive electrode foil 11 is formed. Negative electrode foil 12 is prepared by etching the aluminum foil. Positive electrode foil 11 and negative electrode foil 12 are wound with separator 13 sandwiched therebetween. In capacitor element 19, positive electrode lead 15 is connected to positive electrode foil 11, and negative electrode lead 16 is connected to negative electrode foil 12. Capacitor element 19 is impregnated with a driving electrolyte solution (not shown). Capacitor element 19 is inserted into metallic case 18, such as an aluminum case, and case 18 is sealed with sealing material 17, such as a rubber. Thus, a conventional aluminum electrolytic capacitor can be obtained.

The examples of the material of separator 13 include cellulose fibers, such as Manila hemp, craft, hemp, and esparto. These materials are selected according to the performance, such as thickness and density, as separator 13.

The performance required to the aluminum electrolytic capacitor includes large capacitance, small equivalent series resistance (ESR), and high reliability.

With recent promotion of a size reduction and performance increase in digital circuits in audio visual equipment, personal computers, or the like, increasing capacitance and reliability and decreasing ESR of the aluminum electrolytic capacitor have become more important. To increase capacitance and improve ESR characteristics, studies are made on the material and thickness of the separator and the improvement of the electric conductivity of the driving electrolyte solution.

Patent Documents 1 and 2 are known as the information on the conventional techniques related to the above, for example.

However, a low-density separator used in order to improve the ESR characteristics as shown in the conventional aluminum electrolytic capacitor has a low tensile strength. For this reason, ruptures or displacement occurs when the capacitor element is made by winding, and the stress exerted on the separator by the positive electrode lead connected to the positive electrode foil and the negative electrode lead connected to the negative electrode foil weakens the separator. These phenomena cause short circuits and deteriorate withstand voltage.

Further, when the thickness of the separator is increased with the density thereof kept low for improvement of the strength of the separator, the volume of the electrode foils per unit volume of the capacitor element is decreased in addition that the ESR characteristics are deteriorated. As a result, a decrease in the area of the electrode foils makes the capacitance increase difficult.

Patent Document 1: Japanese Patent Unexamined Publication No. H08-273984

Patent Document 2: Japanese Patent Unexamined Publication No. 2000-173862

SUMMARY OF THE INVENTION

The present invention addresses the above conventional problems, and provides an aluminum electrolytic capacitor that has excellent short-circuit resistance and high-temperature reliability, large capacitance, and small equivalent series resistance (ESR).

For this purpose, the present invention includes a capacitor element that has a positive electrode foil, a first separator, a negative electrode foil, and a second separator sequentially laminated one on another and wound together. After the capacitor element is impregnated with a driving electrolyte solution and housed in a metallic case, an open end of the metallic case is sealed with a sealing material, so that an aluminum electrolytic capacitor is provided. A ratio of B/A, i.e. a ratio of total thickness B of the first and second separators after winding with respect to total thickness A of the first and second separators before winding, is in the range from 0.5 to 0.8.

In the aluminum electrolytic capacitor of the present invention, the ratio B/A, i.e. the ratio of total thickness B of the first and second separators after winding with respect to total thickness A of the first and second separators before winding, is in the range from 0.5 to 0.8. At this ratio, the rate of a change between the total thickness of the separators before winding and that after winding is small. This setting suppresses the stress exerted by the positive electrode lead and the negative electrode lead on the portions of the separators in contact with these leads. Thus, this setting can reduce short circuits caused while the capacitor element is made by winding or a voltage is applied at high temperatures for an extended period of time. As a result, the aluminum electrolytic capacitor has excellent short-circuit resistance.

Further, in particular, it is preferable that an acid component having an acid dissociation constant pKa in the range from 5 to 9 is used as the electrolyte of the driving electrolyte solution. The use of the acid component suppresses deterioration of the separators caused by the acid component particularly in a high-temperature environment. The use of the acid component can prevent short circuits, corrosion of the leads, and an increase in leakage current in high-temperature soldering reflow during surface mounting, and in applying of a high-temperature voltage. Thus, the reliability can be improved.

Further, in particular, it is preferable that a non-protic solvent is used as the major solvent of the driving electrolyte solution. The use of the non-protic solvent can suppress an increase in the pressure caused by the driving electrolyte solution contained in the aluminum electrolytic capacitor or moisture adsorbed on the separators. Thus, the use of the non-protic solvent improves stabilization of the characteristics at high temperatures, and offers an advantage of excellent high-temperature reliability.

DETAILED DESCRIPTION OF PREFERRED EMBODIMENT

Hereinafter, a description is provided of an aluminum electrolytic capacitor in accordance with an exemplary embodiment of the present invention, with reference to the accompanying drawing.

Figure 1:
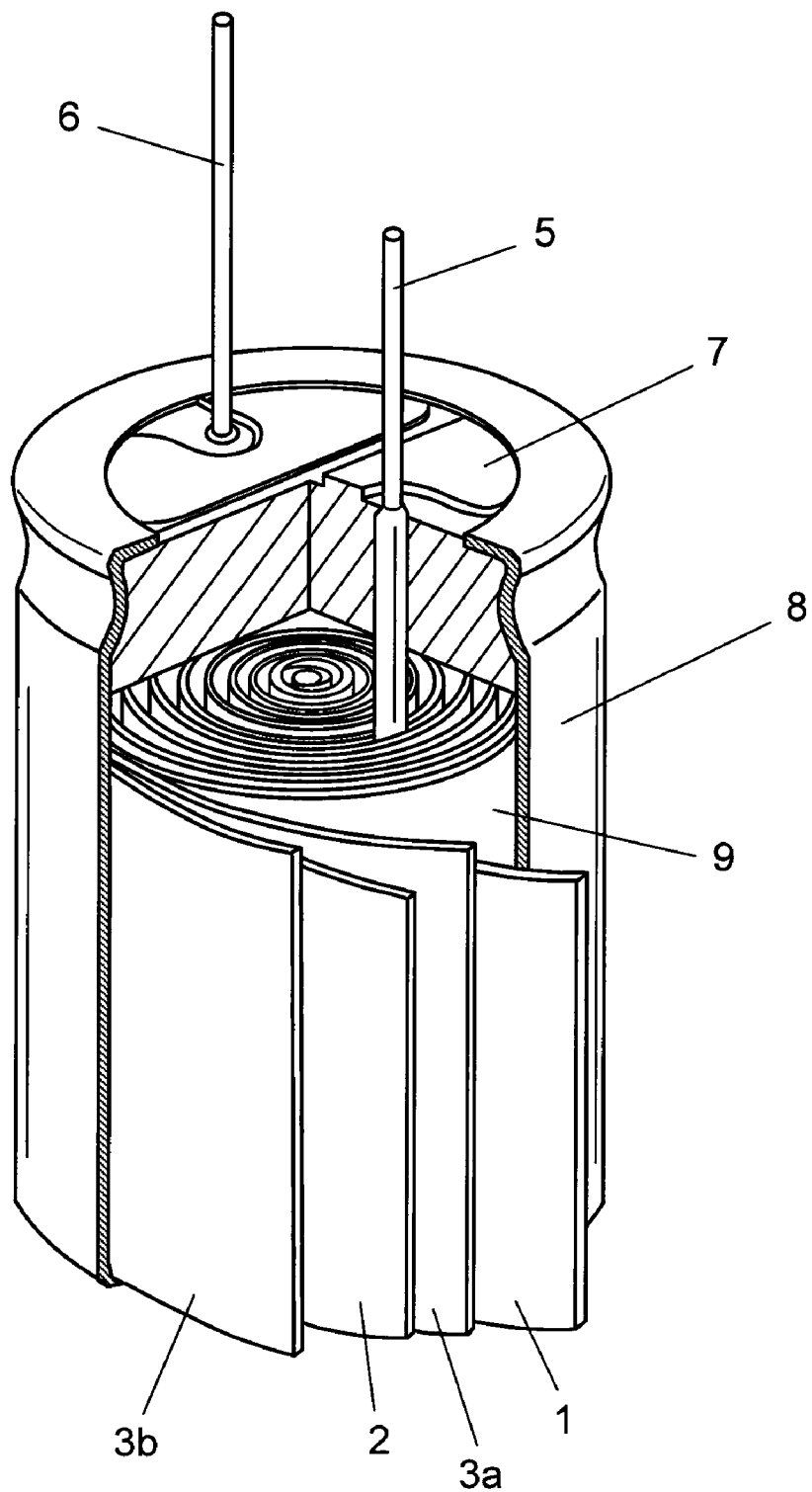
FIG. 1 is a partially cutaway view in perspective of an aluminum electrolytic capacitor in accordance with an exemplary embodiment of the present invention.
Figure 2:
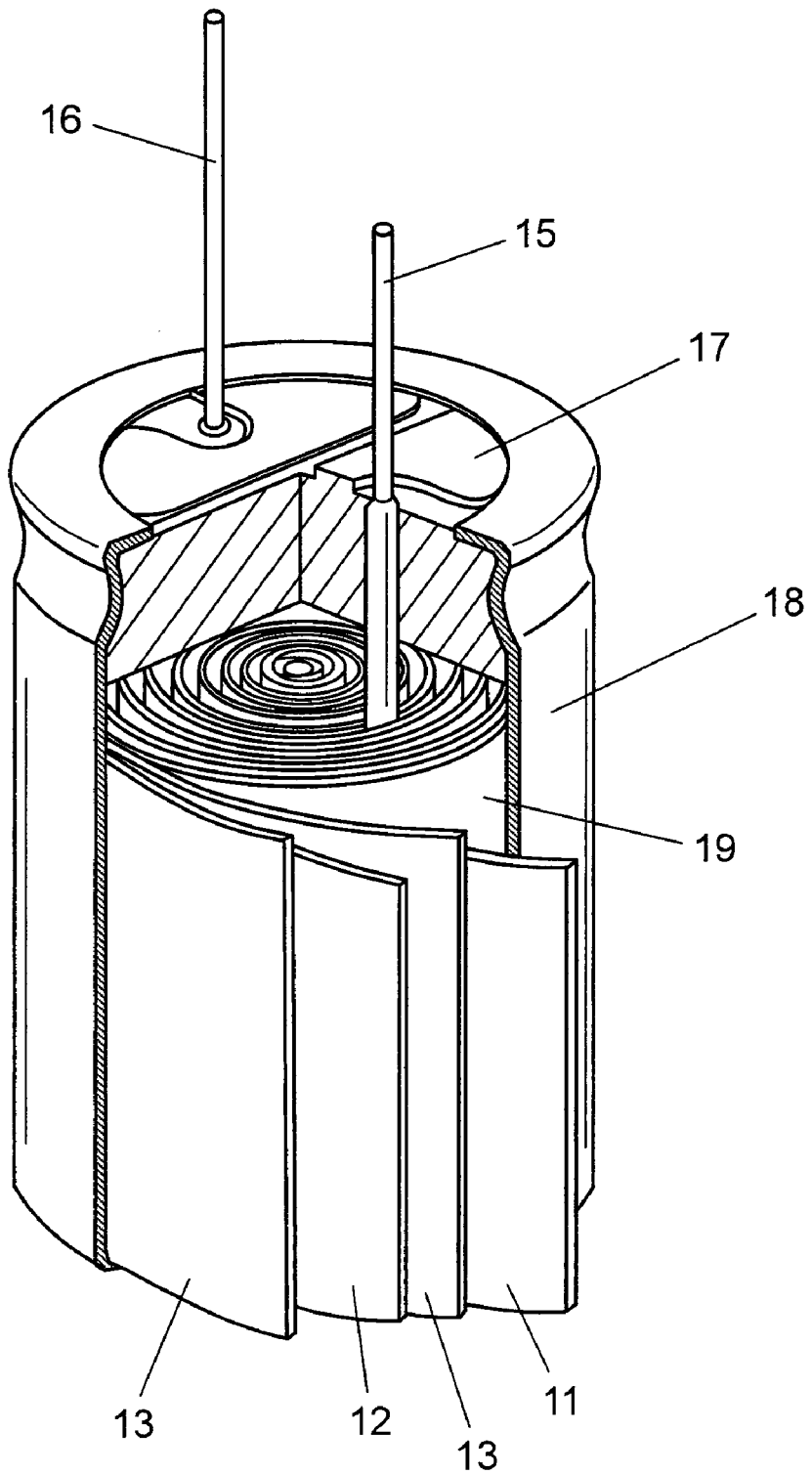
FIG. 2 is a partially cutaway view in perspective of a conventional aluminum electrolytic capacitor.

FIG. 1 is a partially cutaway view in perspective of an aluminum electrolytic capacitor in accordance with the exemplary embodiment of the present invention. With reference to FIG. 1, capacitor element 9 is formed in the following manner. An aluminum foil is etched so that the effective surface area thereof is increased. After a dielectric oxide film, an oxide film of the positive electrode, is formed on the surface of the aluminum foil to provide positive electrode foil 1, positive electrode lead 5 for extracting is connected to positive electrode foil 1. After negative electrode foil 2 is made by etching the aluminum foil, negative electrode lead 6 for extracting is connected to negative electrode foil 2. Positive electrode foil 1, first separator 3a, negative electrode foil 2, and second separator 3b are sequentially laminated one on another and wound together. After thus formed capacitor element 9 is impregnated with a driving electrolyte solution (not shown), capacitor element 9 is inserted into metallic case 8 made of aluminum and an opening of metallic case 8 is sealed with sealing material 7.

Capacitor element 9 is made by winding so that a ratio of B/A, i.e. a ratio of total thickness B of first separator 3a and second separator 3b after winding with respect to total thickness A of first separator 3a and second separator 3b before winding, is in the range from 0.5 to 0.8.

When the ratio B/A is smaller than 0.5, the stress exerted on separators 3a and 3b by the leads during winding can cause short circuits at high possibility. When the ratio B/A exceeds 0.8, the ESR characteristics are deteriorated. For theses reasons, preferably, the ratio B/A is in the range from 0.5 to 0.8.

The type, density, basis weight, and winding method of the separators and the shape of the leads are optimized as described below so that the ratio B/A is set in the range from 0.5 to 0.8. At this time, first separator 3a and second separator 3b need not be distinguished from each other. Hereinafter, first separator 3a and second separator 3b are generically referred to as "the separator" simply.

The materials usable for the separator include cellulose fiber, rayon fiber, polyethylene fiber, polypropylene fiber, and nylon fiber. Particularly in chemical fiber and regenerated fiber, those having a shape without twists or hollow portions are unlikely to be broken by compression during winding, and thus provide excellent short-circuit resistance and ESR characteristics.

It is preferable that the density of the separator is selected from the range from 0.2 to 1.0 $g/cm^3$ so that inhibition of the ion pathway in the driving electrolyte solution is minimized. A separator having a density smaller than 0.2 $g/cm^3$ is effective for the ESR characteristics. However, because the separator has low insulation performance, short-circuit resistance cannot be improved.

In contrast, a separator having a density exceeding 1.0 $g/cm^3$ can improve the short-circuit resistance, but cannot improve the ESR characteristics.

Basis weight of the separator is expressed by the product of density and thickness. When the basis weight is set in the range from 4 to 20 l $g/m^2$, the mechanical strength of the separator can be ensured. This setting can prevent raptures during winding from occurring and improve short-circuit resistance. Further, this setting can increase the volume of the wound element per unit volume of the capacitor. Thus, a large volume of driving electrolyte solution can be held. In addition to capacitance increase, this setting offers a great advantage of stabilizing the characteristics at high temperatures.

In the winding method, a jig having a curved shape is used in the start position of winding so that excessive stress is not exerted on the separator during winding. Further, the stress during winding can be controlled by controlling the winding speed and tension by inverter control and load optimization.

For the shape of the leads, short-circuit resistance can further be improved by the use of leads in a curved shape that has no projection defined by an acute angle at an end face of the leads. A general lead shaped to have an end face defined by an acute angle of 90° exerts excessive stress on the separator and thus deteriorates short-circuit resistance.

Usable for the electrolyte of the driving electrolyte solution are materials that contain an acid component having an acid dissociation constant pKa in the range from 5 to 9. Acid components having a pKa in the range from 5 to 9 include: malonic acid, maleic acid, fumaric acid, phthalic acid, isophthalic acid, terephthalic acid, dimethylmaleic acid, and aminobenzoic acid. When an acid component having an acid dissociation constant pKa smaller than 5 is used for the electrolyte of the driving electrolyte solution, acid promotes the corrosion reaction in the electrode foils and the leads in the high-temperature soldering reflow, thus deteriorating the reliability.

In contrast, when an acid component that has an acid dissociation constant pKa exceeding 9 is used for the electrolyte of the driving electrolyte solution, the small ionization constant thereof lowers electric conductivity.

As the examples of the solvent of the electrolyte solution, non-protic solvents can be used. Such non-protic solvents include: lactones (e.g. γ-butyrolactone, α-valerolactone, and γ-valerolactone); carbonate-based solvent (e.g. ethylene carbonate, propylene carbonate, diethylene carbonate, styrene carbonate, and dimethyl carbonate); nitrile-based solvent (e.g. acetonitrile, and 3-methoxypropionitrile); furan-based solvent (e.g. 2,5-dimethoxy-tetrahydrofuran); sulfolane-based solvent (e.g. sulfolane, 3-methyl sulfolane and 2,5-dimethyl sulfolane); ether-based solvent (e.g. methylal, 1,2-dimethoxydiethane, 1-ethoxy-2-methoxyethane, and 1,2-diethoxyethane); and amide-based solvent (e.g. N-methylformamide, N, N-dimethylformamide, N-methyl acetamide, and N-methylpyrrolidinone). The use of such a solvent as the major solvent can decrease the ESR and stabilize the characteristics at high temperatures.

The examples of the base component of the above electrolyte include tertiary amine compounds, imidazolium compounds, imidazolinium compounds, and pyridinium compounds. The use of such base component can increase the electric conductivity and stabilize the characteristics at high temperatures.

Hereinafter, a detailed description is provided of this exemplary embodiment, with reference to examples.

Example 1

First, the surface of an aluminum foil is roughened by etching. Thereafter, an oxide layer of a dielectric material is formed on the surface of the aluminum foil (at a formation voltage of 22 V) by anodizing so that positive electrode foil 1 (100 μm-thick) is prepared. Positive electrode foil 1 connected with extracting positive electrode lead 5, first separator 3a, negative electrode foil 2, and second separator 3b are sequentially laminated one on another and wound together. First separator 3a made of cellulose fiber has a thickness of 40 μm and a density of 0.4 $g/cm^3$. Negative electrode foil 2 is made by etching the aluminum foil and connected with extracting negative electrode lead 6. Negative electrode foil 2 is 40 μm-thick. Second separator 3b is 40 μm-thick. Thus, capacitor element 9 is obtained. At this time, a ratio of B/A, i.e. a ratio of total thickness B of first separator 3a and second separator 3b after winding with respect to total thickness A of first separator 3a and second separator 3b before winding, is set at 0.5. The winding tension is controlled so that the ratio B/A is kept at 0.5. Each of the leads used have a curved shape that includes no projection defined by an acute angle at an end face of each lead.

Table 1 lists driving electrolyte solutions used in the examples and the comparative examples.

TABLE 1

| | Composition of driving electrolyte solution (wt %) | Acid dissociation constant (pKa) | Type of solvent |
|---|---|---|---|
| A | γ-butyrolactone (75) 1,2,3,4-tetramethyl imidazolinium phthalate (25) | 8.40 | Non-protic |
| B | γ-butyrolactone (75) 1,2,3,4-tetramethyl imidazolinium aminobenzoate (25) | 6.79 | Non-protic |
| C | γ-butyrolactone (75) 1,2,3,4-tetramethyl imidazolinium oxalate (25) | 4.86 | Non-protic |
| D | γ-butyrolactone (75) 1,2,3,4-tetramethyl imidazolinium succinate (25) | 9.24 | Non-protic |
| E | Ethylene glycol monomethyl ether (75) 1,2,3,4-tetramethyl imidazolinium phthalate (25) | 8.40 | Protic |

In Example 1, capacitor element 9 is impregnated with driving electrolyte solution A (composed of 75 wt % of γ-butyrolactone and 25 wt % of 1,2,3,4-tetramethyl imidazolinium phthalate) shown in Table 1. The acid dissociation constant pKa of driving electrolyte solution A is 8.40. Then, after capacitor element 9 is inserted into cylindrical metallic case 8 having a bottom and made of aluminum, the opening of this metallic case is sealed by curling, using sealing material 7 made of resin vulcanized butyl rubber. Thus, an aluminum electrolytic capacitor is fabricated.

Example 2

An aluminum electrolytic capacitor is fabricated in the same manner as Example 1, except that the ratio B/A, i.e. the ratio of total thickness B of first separator 3a and second separator 3b after winding with respect to total thickness A of first separator 3a and second separator 3b before winding, is set at 0.65.

Example 3

An aluminum electrolytic capacitor is fabricated in the same manner as Example 1, except that the ratio B/A, i.e. the ratio of total thickness B of first separator 3a and second separator 3b after winding with respect to total thickness A of first separator 3a and second separator 3b before winding, is set at 0.80.

Example 4

An aluminum electrolytic capacitor is fabricated in the same manner as Example 1, except that driving electrolyte solution B (composed of 75 wt % of γ-butyrolactone and 25 wt % of 1,2,3,4-tetramethyl imidazolinium aminobenzoate, having an acid dissociation constant pKa of 6.79) shown in Table 1 is used.

Comparative Example 1

An aluminum electrolytic capacitor is fabricated in the same manner as Example 1, except that the winding tension is reduced, a separator having a density of 1.0 g/cm$^3$ is used, and the ratio B/A, i.e. the ratio of total thickness B of first separator 3a and second separator 3b after winding with respect to total thickness A of first separator 3a and second separator 3b before winding, is set at 0.85.

Comparative Example 2

An aluminum electrolytic capacitor is fabricated in the same manner as Example 1, except that leads shaped to have an acute angle are used, and the ratio B/A, i.e. the ratio of total thickness B of first separator 3a and second separator 3b after winding with respect to total thickness A of first separator 3a and second separator 3b before winding, is set at 0.45.

Comparative Example 3

An aluminum electrolytic capacitor is fabricated in the same manner as Example 1, except that driving electrolyte solution C (composed of 75 wt % of γ-butyrolactone and 25 wt % of 1,2,3,4-tetramethyl imidazolinium oxalate, having an acid dissociation constant pKa of 4.86) shown in Table 1 is used.

Comparative Example 4

An aluminum electrolytic capacitor is fabricated in the same manner as Example 1, except that driving electrolyte solution D (composed of 75 wt % of γ-butyrolactone and 25 wt % of 1,2,3,4-tetramethyl imidazolinium succinate, having an acid dissociation constant pKa of 9.24) shown in Table 1 is used.

Comparative Example 5

An aluminum electrolytic capacitor is fabricated in the same manner as Example 1, except that driving electrolyte solution E (composed of 75 wt % of ethylene glycol monomethyl ether and 25 wt % of 1,2,3,4-tetramethyl imidazolinium phthalate, having an acid dissociation constant pKa of 8.40) shown in Table 1 is used. Ethylene glycol monomethyl ether is a protic solvent.

Twenty pieces of aluminum electrolytic capacitors are fabricated for each of Examples 1 through 4 and Comparative Examples 1 through 5. Initial characteristics tests, life tests (at 105°, under load of 16 V, for 200 hours) and high-temperature soldering reflow tests are conducted on these aluminum electrolytic capacitors. Table 2 shows the results. Each of the aluminum electrolytic capacitors is dimensioned 10 mm in diameter and 10 mm in length. Each capacitor is designed so that the rated voltage thereof is 16 V and each capacitor element has the same void ratio. Ripple load tests are conducted at a temperature of 105° C.

TABLE 2

| | Ratio of separator thickness (B/A) | Acid dissociation constant pKa of electrolyte solution | Type of solvent | Initial characteristics | | | After high-temperature soldering reflow | | | After 2000 hours, at 105° C., under load of 16 V | | |
|---|---|---|---|---|---|---|---|---|---|---|---|---|
| | | | | Capacitance (μF) | ESR (mΩ) | Number of short circuits | Rate of capacitance change (%) | ESR (mΩ) | Number of short circuits | Rate of capacitance change (%) | ESR (mΩ) | Number of short circuits |
| Example 1 | 0.5 | 8.40 | Non-protic | 471 | 45 | 0 | −3 | 46 | 0 | −13 | 50 | 0 |
| Example 2 | 0.65 | 8.40 | Non-protic | 512 | 44 | 0 | −3 | 45 | 0 | −13 | 51 | 0 |
| Example 3 | 0.8 | 8.40 | Non-protic | 532 | 44 | 0 | −3 | 45 | 0 | −12 | 50 | 0 |
| Example 4 | 0.5 | 6.79 | Non-protic | 470 | 50 | 0 | −4 | 51 | 0 | −13 | 55 | 0 |
| Comparative Example 1 | 0.85 | 8.40 | Non-protic | 541 | 68 | 0 | −5 | 69 | 0 | −20 | 73 | 0 |
| Comparative Example 2 | 0.45 | 8.40 | Non-protic | 459 | 42 | 3 | −5 | 44 | 5 | −22 | 55 | 7 |
| Comparative Example 3 | 0.5 | 4.86 | Non-protic | 471 | 40 | 0 | −9 | 52 | 2 | −31 | 66 | 5 |
| Comparative Example 4 | 0.5 | 9.24 | Non-protic | 470 | 84 | 0 | −4 | 89 | 0 | −15 | 99 | 0 |
| Comparative Example 5 | 0.5 | 8.40 | Protic | 471 | 44 | 0 | −10 | 76 | 0 | −41 | 132 | 0 | n = 20

As obvious from Table 2, in each aluminum electrolytic capacitor of Examples 1 through 4, the ratio of B/A, i.e. a ratio of total thickness B of the separators after winding with respect to total thickness A of the separators before winding, is in the range from 0.5 to 0.8. The results show that each aluminum electrolytic capacitor of Examples 1 through 4 provides initial characteristics, characteristics after the high-temperature soldering reflow, and characteristics after the life test (high-temperature degradation characteristics) more excellent than those of Comparative Examples 1 through 5.

The aluminum electrolytic capacitor of Comparative Example 1 has a ratio of B/A of the total thickness of the separators larger than 0.8. This ratio causes considerable deterioration of the initial characteristics and life characteristics. The aluminum electrolytic capacitor of Comparative Example 2 has a ratio of B/A of the total thickness of the separators smaller than 0.5 and the leads shaped to have an acute angle. The results show these conditions cause more short circuits.

The aluminum electrolytic capacitor of Comparative Example 3 employs a driving electrolyte solution having an acid dissociation constant pKa smaller than 5. In this case, acid considerably deteriorates the separators. Thus, short-circuit resistance after the high-temperature soldering reflow and the life test is deteriorated.

On the other hand, the aluminum electrolytic capacitor of Comparative Example 4 employs a driving electrolyte solution having an acid dissociation constant pKa larger than 9. In this case, the electric conductivity of the driving electrolyte solution is decreased and thus the ESR characteristics are deteriorated.

Further, the aluminum electrolytic capacitor of Comparative Example 5 employs a protic solvent for the driving electrolyte solution. It causes deterioration in heat stability. Thus, the characteristics of the capacitors are deteriorated in the high-temperature soldering reflow and life test.

As described above, in the aluminum electrolytic capacitor of the present invention, a ratio of B/A, i.e. a ratio of total thickness B of first separator 3a and second separator 3b after winding with respect to total thickness A of first separator 3a and second separator 3b before winding, is set in the range from 0.5 to 0.8. At this ratio, the rate of a change between the total thickness of the separators before winding and that after winding is small. This setting suppresses the stress exerted by positive electrode lead 5 and negative electrode lead 6 on the portions of the separators in contact with these leads. As a result, an aluminum electrolytic capacitor having excellent short-circuit resistance, ESR characteristics, and high-temperature reliability can be provided.

INDUSTRIAL APPLICABILITY

The present invention provides an aluminum electrolytic capacitor having an excellent short-circuit resistance, high capacitance, long life, and low ESR characteristics. The present invention can satisfy the demand for a size reduction and performance increase in the digital circuits or the like in audio visual equipment, personal computers, or the like.

The invention claimed is:

1. An aluminum electrolytic capacitor comprising:
   a capacitor element having a positive electrode foil, a first separator, a negative electrode foil, and a second separator, which are sequentially laminated one on another and wound together,
   a driving electrolyte solution with which the capacitor element is impregnated,
   a metallic case housing the capacitor element and the driving electrolyte solution therein,
   a sealing material sealing an open end of the metallic case wherein
   a ratio of B/A, i.e. a ratio of total thickness B of the first separator and the second separator after winding with respect to total thickness A of the first separator and the second separator before winding, is in a range from 0.5 to 0.8.

2. The aluminum electrolytic capacitor according to claim 1, wherein an acid component having an acid dissociation constant pKa in a range from 5 to 9 is used for an electrolyte of the driving electrolyte solution.

3. The aluminum electrolytic capacitor according to claim 2, wherein a non-protic solvent is used as a major solvent of the driving electrolyte solution.

4. The aluminum electrolytic capacitor according to claim 1, wherein at least one of the first separator and the second separator has a density in a range from 0.2 to 1.0 g/cm³.

5. The aluminum electrolytic capacitor according to claim 1, wherein at least one of the first separator and the second separator has a basis weight in a range from 4 to 20 g/m².

6. The aluminum electrolytic capacitor according to claim 1, further comprising:

a positive electrode lead coupled to the positive electrode foil; and a negative electrode lead coupled to the negative electrode foil, wherein contact surfaces of the positive electrode lead with respect to the positive electrode foil and one of the first separator and the second separator are shaped into a curved surface, and contact surfaces of the negative electrode lead with respect to the negative electrode foil and one of the first separator and the second separator are also shaped into a curved surface.

* * * * *

UNITED STATES PATENT AND TRADEMARK OFFICE
CERTIFICATE OF CORRECTION

PATENT NO. : 7,990,681 B2
APPLICATION NO. : 12/300058
DATED : August 2, 2011
INVENTOR(S) : Hisao Nagara et al.

Page 1 of 1

It is certified that error appears in the above-identified patent and that said Letters Patent is hereby corrected as shown below:

In column 1, line 4, the PCT number should be "PCT/JP2007/059584"

In column 3, line 63, please delete the "1" that is between "20" and "g/m"

Signed and Sealed this
Third Day of January, 2012

David J. Kappos
*Director of the United States Patent and Trademark Office*